(No Model.)
J. D. FREDERIKSEN & P. RASCH.
CENTRIFUGAL MACHINE FOR TESTING MILK AND CREAM.
No. 330,780. Patented Nov. 17, 1885.
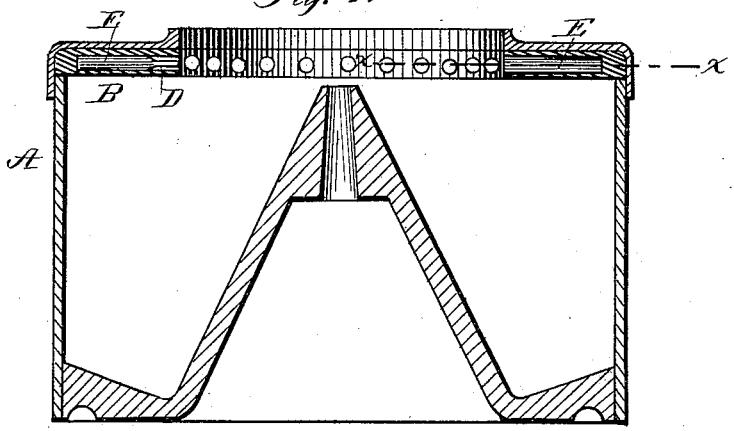
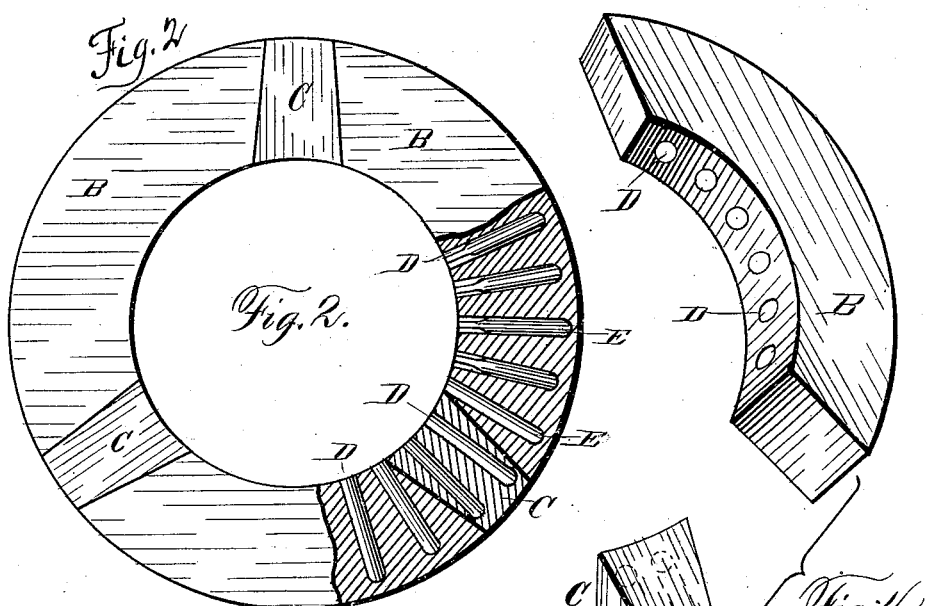
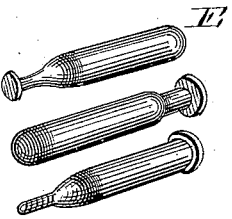
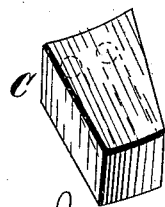

UNITED STATES PATENT OFFICE.

JOHN DITLER FREDERIKSEN, OF LITTLE FALLS, NEW YORK, AND PETER RASCH, OF PHILADELPHIA, PENNSYLVANIA.

CENTRIFUGAL MACHINE FOR TESTING MILK AND CREAM.

SPECIFICATION forming part of Letters Patent No. 330,780, dated November 17, 1885.

Application filed July 19, 1884. Serial No. 138,192. (No model.)

*To all whom it may concern:*

Be it known that we, JOHN D. FREDERIKSEN, of Little Falls, in the county of Herkimer and State of New York, and PETER RASCH, of Philadelphia, in the county of Philadelphia and State of Pennsylvania, have invented certain new and useful Improvements in Apparatus for Testing Milk and Cream; and we do hereby declare that the following is a full, clear, and exact description of the invention, which will enable others skilled in the art to which it appertains to make and use the same, reference being had to the accompanying drawings, which form a part of this specification, and in which—

Figure 1 is a vertical sectional view of the cylinder of a centrifugal creamer, showing our improved milk-testing apparatus in position. Fig. 2 is a top view of the apparatus, partly in horizontal section on line $x\,x$, Fig. 1. Fig. 3 is a view of the test bottles or tubes used for milk of different richness or for the different fluid constituents of milk, and Fig. 4 is a detail view of one of the segments and wedges.

Similar letters of reference indicate corresponding parts in all the figures.

Our invention has relation to apparatus for testing milk or the several fluids constituting milk—such as skimmed milk, buttermilk, whey, or cream—for the purpose of ascertaining the percentage of fat or butter globules contained in the same; and it consists, to that end, in the improved construction and combination of parts of such an apparatus, as hereinafter more full described and claimed.

In the accompanying drawings, the letter A indicates the cylinder of a centrifugal creamer of any desired construction, the cylinder being only shown, inasmuch as the apparatus may, with a few unimportant changes, be adapted to fit the cylinder of any centrifugal creamer; and B indicates a number of segmental blocks having their ends cut off, diverging toward the periphery, so as to adapt them to receive a number of wedge-shaped blocks, C, between their ends, the entire ring formed by these blocks being shaped to fit against the sides of the cylinder, the wedges being driven farther out by the centrifugal force when the cylinder is rotated, thus securing the blocks in the same. The blocks have a number of radiating bores or recesses, D, opening in the inner faces of the blocks, and of a cylindrical shape, and a number of test bottles or tubes, E, may be inserted into these recesses, the said bottles or tubes having their necks contracted for testing milk or constituents of milk containing a small percentage of cream, or butter or fat globules—such as skimmed milk, buttermilk, or whey—while the neck of the bottle or tube is increased in width for the test of cream; and the said necks are graduated so as to enable the operator to read the exact percentage of fat or butter globules contained in the milk. When this ring of blocks is inserted into the cylinder and secured by the wedge-shaped blocks, the bottles or tubes filled with the fluid to be tested, and the machine started, the thinner and consequently heavier portions of the fluids will be forced by the centrifugal force toward the bottoms of the tubes, which point outward, while the fat and consequently light portions of the fluid will gather in the necks of the tubes and be separated from the thinner fluid, showing a perfect, clear, and sharp separating-line, which will enable the operator to read with perfect certainty the percentage of fat contained in the sample in the tube by means of the graduated neck.

Having thus described our invention, we claim and desire to secure by Letters Patent of the United States—

1. The combination of segmental blocks having a number of radiating cylindrical bores or recesses for the reception of test-tubes, and having their ends cut off obliquely, the said blocks adapted to fit within the sides of the cylinder of a centrifugal creamer, with wedge-shaped blocks having radiating cylindrical bores or recesses for the reception of test-tubes, and adapted to fit between the oblique ends of the segmental blocks, as and for the purpose shown and set forth.

2. The combination, with the cylinder of a centrifugal creamer, of an annular frame fitting within it and provided with a number of radiating recesses, and a number of test-tubes fitting in the said recesses, as and for the purpose shown and set forth.

3. The combination of the cylinder of a centrifugal creamer, a number of segmental blocks adapted to fit within the cylinder, having a number of radiating bores or recesses opening at their inner faces for the reception of test-tubes, and having their ends cut off diverging toward their outer peripheries, wedge-shaped blocks having bores or recesses radiating from their inner sides, and test bottles or tubes fitting within the bores or recesses, as and for the purpose shown and set forth.

In testimony that we claim the foregoing as our own we have hereunto affixed our signatures in presence of two witnesses.

JOHN DITLER FREDERIKSEN.
PETER RASCH.

Witnesses:
J. P. HAUSEN,
F. REINAU,
ROBT. DAWSON,
WM. THOS. DAWSON.